United States Patent
Park

(10) Patent No.: US 8,351,638 B2
(45) Date of Patent: Jan. 8, 2013

(54) PORTABLE TERMINAL WITH SPEAKER DEVICE

(75) Inventor: Jung-Won Park, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 355 days.

(21) Appl. No.: 12/691,888

(22) Filed: Jan. 22, 2010

(65) Prior Publication Data

US 2010/0202650 A1    Aug. 12, 2010

(30) Foreign Application Priority Data

Feb. 6, 2009    (KR) .................. 10-2009-0009705

(51) Int. Cl.
*H04R 1/02*    (2006.01)
(52) U.S. Cl. ....................................... 381/387; 381/386
(58) Field of Classification Search ............... 455/575.4; D14/138 AD
See application file for complete search history.

(56) References Cited

U.S. PATENT DOCUMENTS

| | | | |
|---|---|---|---|
| D541,796 S   * | 5/2007 | Chen ......................... | D14/480.7 |
| 2005/0197173 A1* | 9/2005 | Wee et al. ................... | 455/575.4 |
| 2006/0240881 A1* | 10/2006 | Cho et al. .................... | 455/575.4 |
| 2007/0197270 A1* | 8/2007 | Kim ............................ | 455/575.4 |

* cited by examiner

*Primary Examiner* — Yuwen Pan
*Assistant Examiner* — Matthew Eason
(74) *Attorney, Agent, or Firm* — Cha & Reiter, LLC

(57) ABSTRACT

A portable terminal with a speaker device includes a body housing, and a speaker module provided in the body housing and slidably retracted or extracted into/from the body housing. The speaker module includes a speaker housing slidably settled in the body housing, guide rails provided in the body housing, for sliding the speaker housing, at least one guide protrusion provided on the speaker housing and slidably engaged with the guide rails, and a moving member protruding from the speaker housing to an outside of the body housing, for retracting or extracting the speaker housing into/from the body housing.

17 Claims, 7 Drawing Sheets

PORTABLE TERMINAL WITH SPEAKER DEVICE

CLAIM OF PRIORITY

This application claims the benefit of an earlier Korean Patent Application filed in the Korean Intellectual Property Office on Feb. 6, 2009 and assigned Serial No. 10-2009-0009705, the entire disclosure of which is hereby incorporated by reference.

BACKGROUND OF THE INVENTION

1. Field of the Invention

The present invention relates generally to a portable terminal, and more particularly, to a portable terminal with a retractable speaker device.

2. Description of the Related Art

Portable terminals have become one of the important daily necessities that are indispensable for people in their everyday life. With the development of communication technologies, such portable terminals may offer users not only the typical call service but also a variety of multimedia services such as a message service, a video service, an MPEG Audio Layer 3 (MP3) service, an Internet service, a Digital Multimedia Broadcasting (DMB) service, and a game service.

Generally, portable terminals provide a variety of high-quality sounds for the multimedia services and support many new and improved functions, downloading audio and/or music files and providing an audio playback function and downloading video (multimedia) data and providing a video playback function. As many users enjoy multimedia functions, such as DMB and games, speakers capable of providing higher-quality sounds are commonly mounted in the portable terminals.

FIG. 1 illustrates a portable terminal in which a receiver (or earpiece) and a speaker are integrally formed according to the prior art, and FIG. 2 illustrates a portable terminal in which a receiver and a speaker are separately formed according to the prior art.

Referring to FIG. 1, on a body housing 11 of a portable terminal 10, a receiving hole 14 is formed in an upper portion of a display device 12 that visualizes images and content, and a microphone (or transmitter/mouthpiece) 13 is arranged in a lower portion of the display device 12. A speaker 15 is integrally formed in the receiving hole (opening) 14 in such a manner that the speaker 15 is provided inside the body housing 11 and generates sounds to the outside.

Since the speaker 15 is integrally formed in the receiving hole 14, the sound quality of multimedia, such as bell, MP3 and video, may deteriorate during playback of the multimedia. Hence, there is a limitation in achieving a sound effect suiting a user's taste.

In addition, the receiving hole 14 formed in the body housing 11 is limited in size and the recent slimming trend of portable terminals reduces an installation space for the speaker 15, lowering efficiency of sound radiation through the receiving hole 14.

Referring to FIG. 2, a receiver 22, through which a user can receive voice from another party during a call, is provided in a body housing 21 of a portable terminal 20. A speaker 23 is provided under the receiver 22 separately from the receiver 22 to output or radiate sounds generated during playback of multimedia or content, e.g., MP3 files, videos, DMB and games. The speaker 23 may be provided in an opposing relationship with the receiver 22, or may be provided at both sides of the receiver 22.

Since the receiver 22 and the speaker 23 are provided independently in the body housing 21, the installation space increases, which is an impediment to the slimming trend in portable devices. In addition, the speaker 23 requires a resonance space for generating sounds, which further increases thickness of the body housing 21.

Therefore, there is a need for a portable terminal with a speaker that can provide an aesthetic sense of the portable terminal and easily secure a resonance space for a slim speaker device.

In addition, a need exists for a portable terminal with a speaker that can improve the quality of the sounds output during playback of multimedia content such as MP3, videos, DMB and games.

SUMMARY OF THE INVENTION

An aspect of the present invention provides a portable terminal with a speaker device in which the speaker device is slidably provided in a body housing of the portable terminal so that a speaker module can be used together with or separately from a receiving hole.

Another aspect of the present invention provides a portable terminal with a speaker device, in which the speaker device is slidably provided in a body housing so that in a general call or transmission/reception mode, the speaker device is retracted inside the body housing to improve an aesthetic style and enable delivery of bell sound and received sound, and in a multimedia mode, the speaker device is extracted from the body housing to offer a user high-quality sound reproduction.

In accordance with one aspect of the present invention, a portable terminal with a speaker device is provided. The portable terminal includes a body housing, and a speaker module provided in the body housing and slidably retracted into, or extracted from, the body housing.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
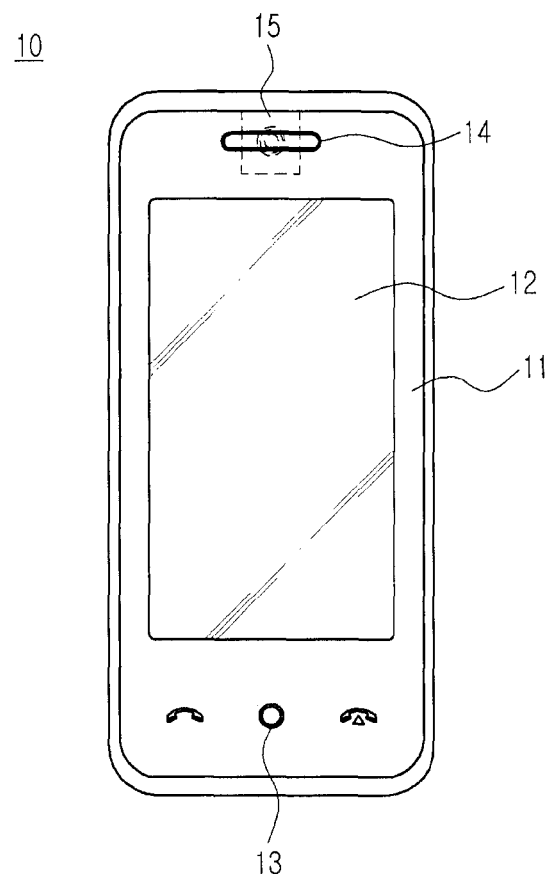
FIG. 1 is a plane view of a portable terminal with a speaker integrally built in a receiver according to the prior art.
Figure 2:
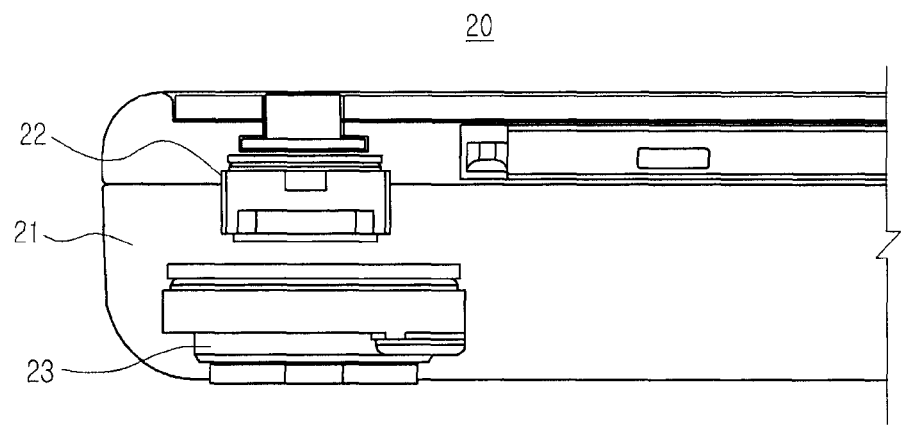
FIG. 2 is a partial cross-sectional view of a portable terminal with a speaker device separately formed in a receiver according to the prior art.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Referring to FIGS. 3 through 9, a portable terminal 100 with a speaker device includes a body housing 110 and a speaker module 120 is shown. The speaker module 120 is provided in the body housing 110 so that the speaker module 120 is slidably retracted into and extracted from the body housing 110.

Figure 3:
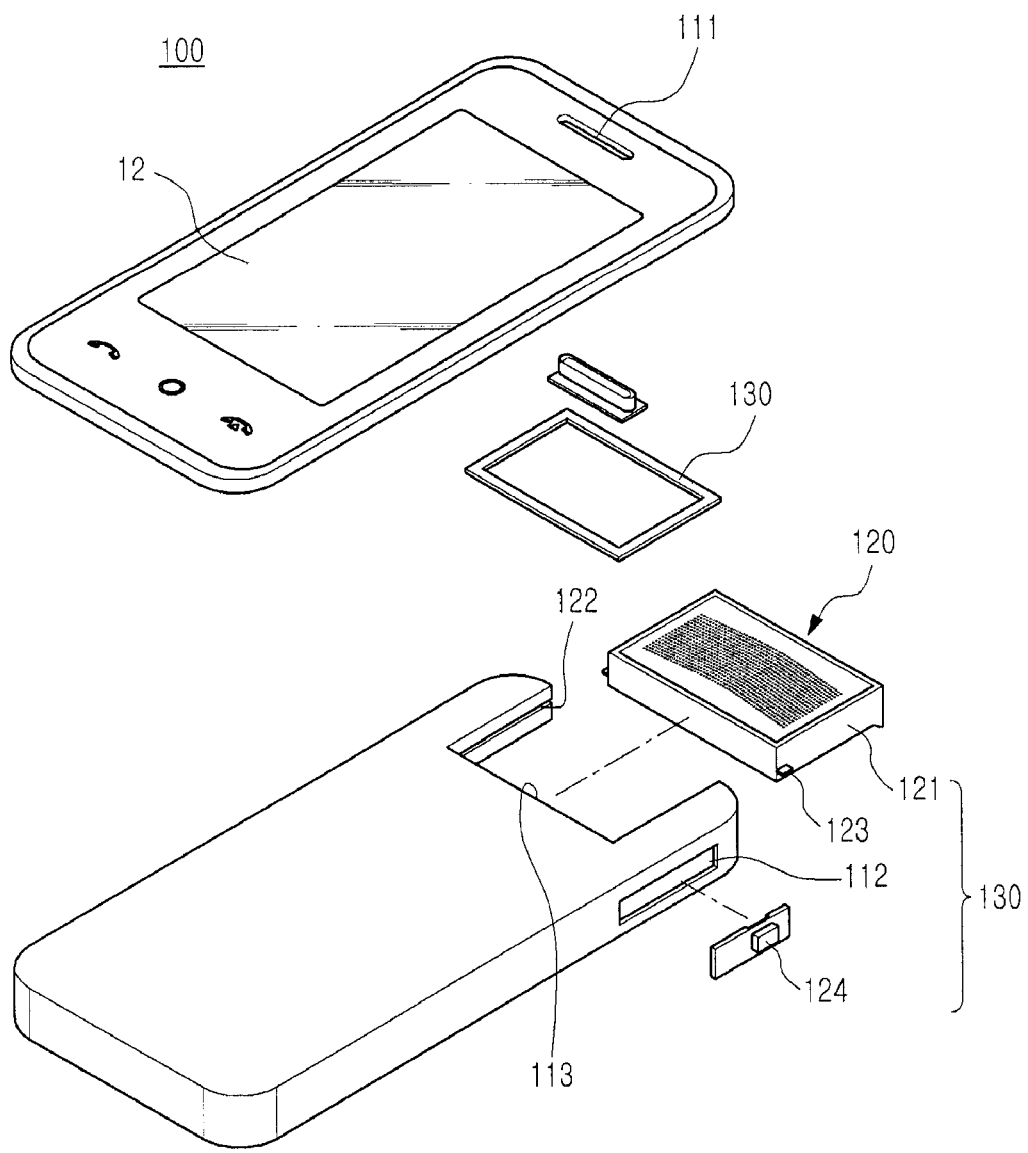
FIG. 3 is a disassembled perspective view of a portable terminal with a retractable speaker device according to an embodiment of the present invention.
Figure 7:
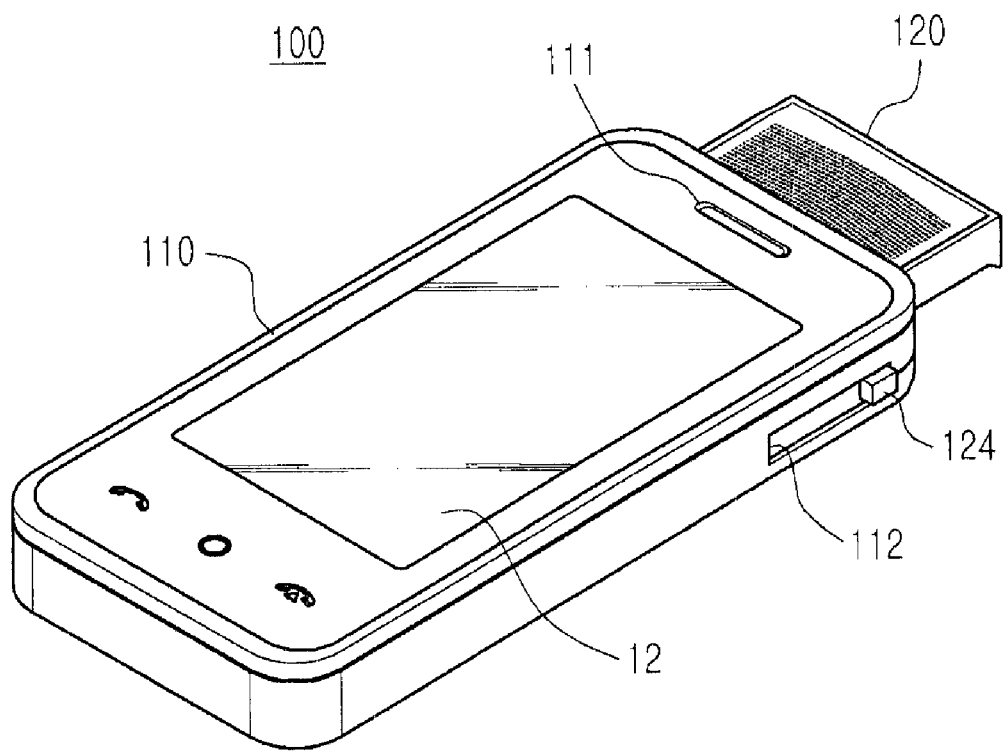
FIG. 7 is a perspective view showing a state where a speaker module is extracted from a body housing in a portable terminal with a speaker device according to an embodiment of the present invention.
Figure 8:
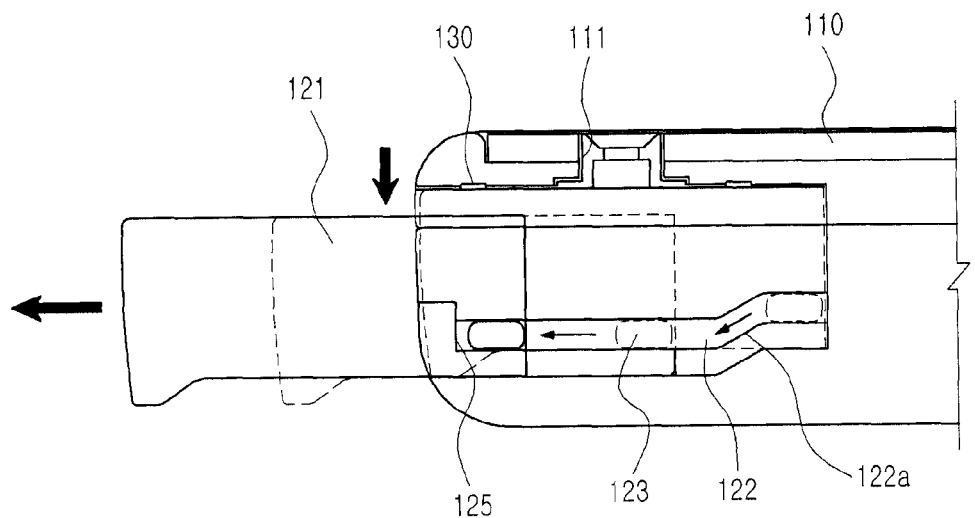
FIG. 8 is a view showing how a speaker module is extracted from a body housing in a portable terminal with a speaker device according to an embodiment of the present invention.

Referring to FIGS. 3, 7 and 8, the speaker module 120 includes a speaker housing 121, guide rails 122, guide protrusions 123, and a moving member 124. The speaker housing 121 is slidably settled in the body housing 110. The guide rails 122 are provided in the body housing 110 to slide the speaker housing 121. One or more guide protrusions 123 are provided on the speaker housing 121 so that protrusions 123 engage with the guide rails 122 during movement of the speaker housing 121. The moving member 124 protrudes from the speaker housing 121 on the outside of the body housing 110 so that the user can retract or extract the speaker housing 121.

Referring to FIGS. 3 through 9, a receiving hole 111 is formed in the body housing 110 so as to output a received sound in the speaker housing 121 to the outside of the body housing 110. An elastic member 130 is provided along circumference or perimeter of the receiving hole 111. Upon retraction of the speaker housing 121, the elastic member 130 makes contact with the speaker housing 121 so as to prevent sound leakage between the speaker module 120 and the body housing 110, and output sounds through the receiving hole 111 by forming a resonance space.

An incline 122a is formed on each of the guide rails 122 in such a manner that upon retraction of the speaker housing 121, the incline 122a (see FIG. 8) pushes up the speaker housing 121 to the front of the body housing 110. Upon extraction of the speaker housing 121, the incline 122a pushes down the speaker housing 121 to the back of the body housing 110 (see FIG. 9).

A stopper 125 (shown in FIGS. 8 and 9) for stopping movement of each of the guide protrusions 123 is formed at one end of each of the guide rails 122.

A moving hole 112 is formed in one side of the body housing 110 so that the moving member 124 is slidably settled in the moving hole 112 (see FIG. 7).

Figure 4:
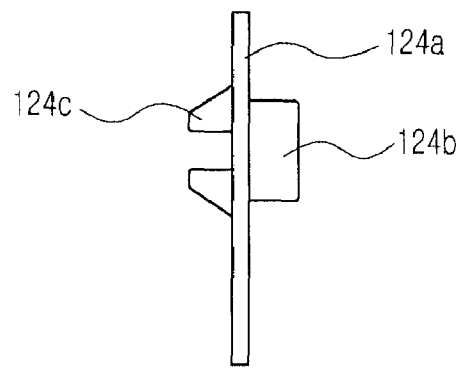
FIG. 4 is an enlarged view of the moving member shown in FIG. 3.
Figure 9:
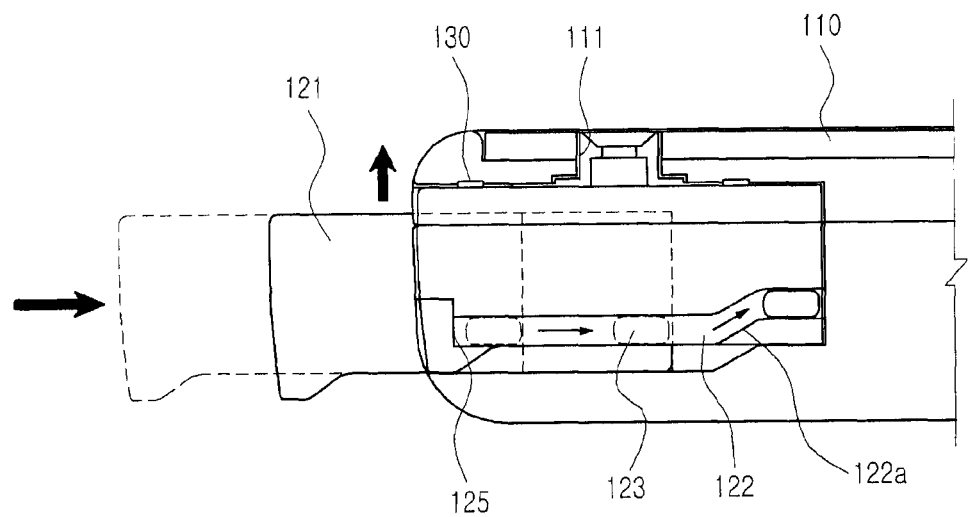
FIG. 9 is a view showing how an extracted speaker module is retracted into a body housing in a portable terminal with a speaker device according to an embodiment of the present invention.

Referring to FIGS. 4 and 9, the moving member 124 includes a plate 124a, a protrusion 124b and coupling protrusions 124c. The plate 124a is slidably settled in the moving hole 112. The protrusion 124b protrudes from one side of the plate 124a to the outside of the body housing 110 so that the user may slide the plate 124a. The coupling protrusions 124c protrude from the other side of the plate 124a so that they are engaged with the speaker housing 121.

Referring to FIGS. 8 and 9, in a call or transmission/reception mode, the speaker housing 121 is retracted inside the body housing 110, makes contact with the elastic member 130, and outputs a received sound through the receiving hole 111. In a multimedia mode, the speaker housing 121 is extracted outside the body housing 110 and outputs the played multimedia sound to the outside of the speaker housing 121.

Operation of the portable terminal 100 with a speaker device according to an embodiment of the present invention will be described in detail with reference to FIGS. 3 to 9.

Referring to FIGS. 3, 7 and 8, the portable terminal 100 with a speaker device includes the body housing 110 with a display device 12 and the speaker module 120 that is slidably retracted into or extracted from one side of the body housing 110. In this illustrated case, a top side. However, it would be recognized by those skilled in the art that the speaker may retract into or extend from a side element of housing 110.

The display device 12 is provided on the front of the body housing 110, and the receiving hole 111 is provided in an upper portion of the display device 12. The receiving hole 111 is formed opposite to the speaker module 120 so as to output the sound generated in the speaker module 120 to the outside of the body housing 110.

The speaker housing 121 is nested in an installation space 113 that is formed in one side of the body housing 110. The speaker housing 121 is slidably retracted into or extracted from the installation space 113. The guide rails 122 are formed in the installation space 113 facing both sides of the speaker housing 121 along the retraction/extraction direction so as to enable sliding movement of the speaker housing 121. The guide rails 122 are formed along both sides of the installation space 113 in the sliding direction so that the guide protrusions 123, on speaker housing 121) are slidably settled in the guide rails 122. The guide protrusions 123 protrude from both sides of the speaker housing 121 and are settled in the guide rails 122 so that the guide protrusions 123 may slide along the guide rails 122 if the user moves the moving member 124. The incline 122a, which is inclined toward the rear of the body housing 110, is formed on each of the guide rails 122. Therefore, the guide protrusions 123 slide on the inclines 122a along the guide rails 122. By the inclines 122a, the speaker housing 121 is pushed down to the back of the body housing 110 by the height of the guide rail gradient when the speaker housing is extracted. In addition, when retracted into the body housing 110, the speaker housing 121 is pushed up to the front of the body housing 110.

Figure 5:
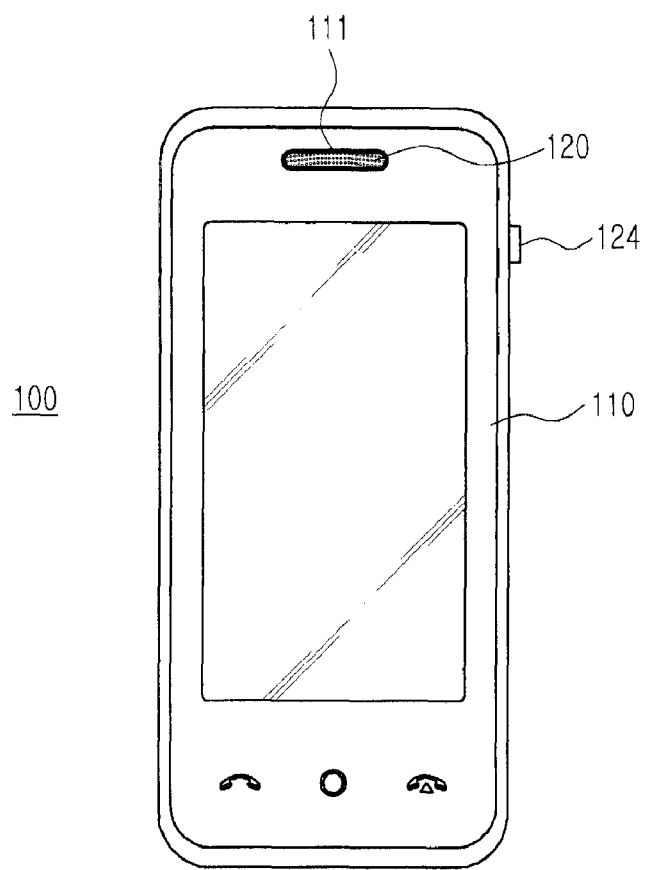
FIG. 5 is a plane view of an assembled portable terminal with a speaker device according to an embodiment of the present invention.

Referring to FIGS. 3 through 5, the moving member 124 is slidably settled in the moving hole (slot) 112 formed in a side of the body housing 110. The plate 124a (FIG. 4) is slidably settled in the moving hole 112 so that the plate 124a may slide in the moving hole 112 when the protrusion 124b is moved. The protrusion 124b and the coupling protrusions 124c are formed on one side and the other side of the plate 124a, respectively. The protrusion 124b protrudes from one side of the plate 124a to the outside of the moving hole 112. By moving the plate 124a, it is possible to retract into or extract from the body housing 110 the speaker housing 121 engaged with the moving member 124. The coupling protrusions 124c protrude from the other side of the plate 124a to the inside of the body housing 110 so that they are engaged with the speaker housing 121. Accordingly, when the user moves the protrusion 124b, the plate 124a slides in the moving hole 112 and the coupling protrusions 124c slide the speaker housing 121 in the installation space 113.

Referring to FIGS. 3 and 9, the elastic member 130 is provided inside the body housing 110 along the circumference (perimeter) of the receiving hole 111. When the speaker housing 121 is retracted into the installation space 113, the speaker housing 121 is pushed up by the inclines 122a to the front of the body housing 110. Hence, the speaker housing 121 makes contact with the elastic member 130 formed along the circumference of the receiving hole 111. Since the front of the speaker housing 121 is in contact with the elastic member 130, it is possible to prevent the sound generated in the speaker module 120 from being output through the installation space 113 and to output the sound through the receiving hole 111. As the speaker module 120 makes contact with the elastic member 130, a resonance space is formed between the speaker module 120 and the receiving hole 111, making it possible to output the sound through the receiving hole 111.

Referring to FIGS. 3 and 9, in a state where the user carries the portable terminal 100 with him, or in the call mode, the speaker module 120 is retracted into the installation space 113. In this state, since the speaker housing 121 is in contact with the inside of the body housing 110 by the elastic member 130, the resonance space is formed between the speaker housing 121 and the receiving hole 111, and the speaker housing 121 outputs the sound only through the receiving hole 111. The elastic member 130 is preferably made of a material such as rubber and sponge.

Figure 6:
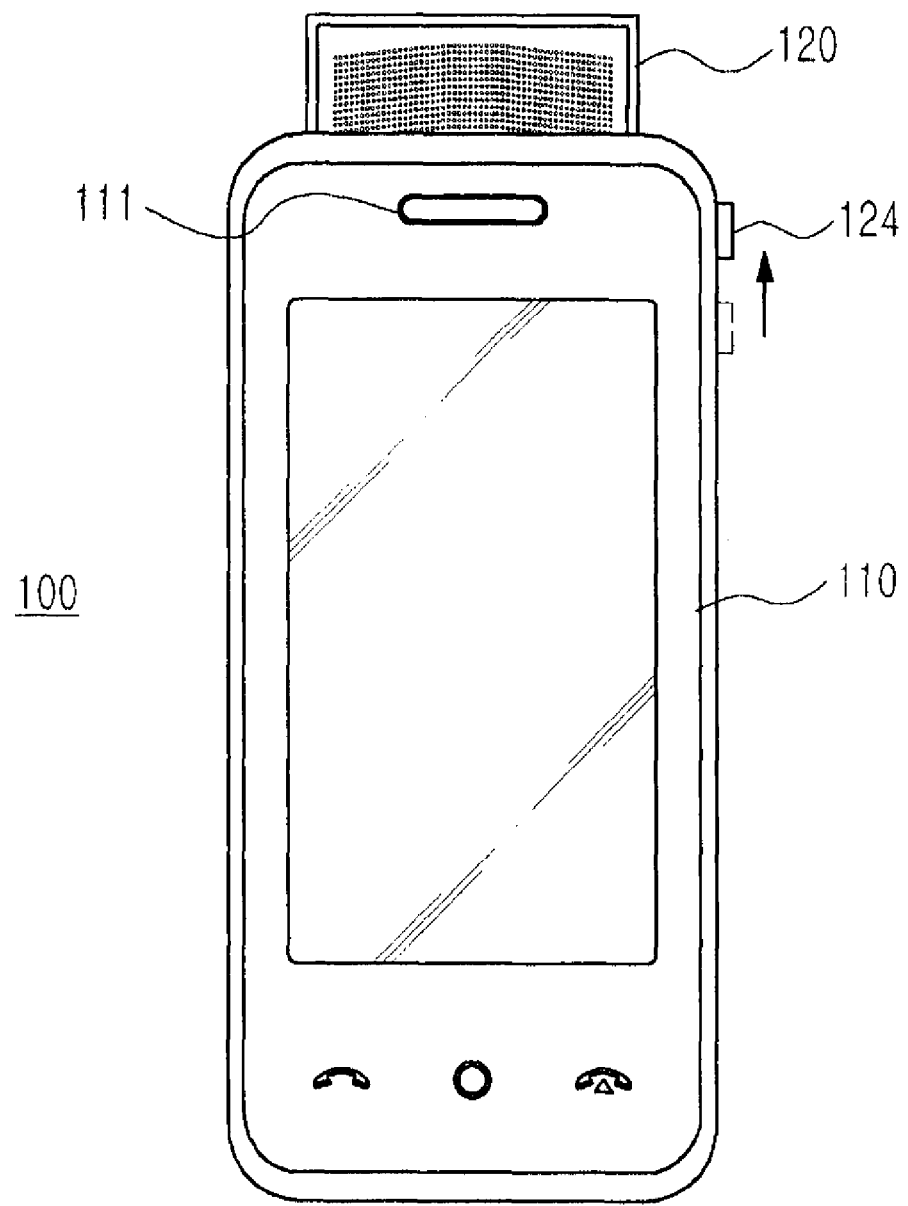
FIG. 6 is a view showing a state where a speaker module is extracted from a body housing in a portable terminal with a speaker device according to an embodiment of the present invention.

Referring to FIGS. 4, 6 and 8, the speaker module 120 is extracted from the installation space 113. To extract the speaker housing 121, the user moves the protrusion 124b of the moving member 124 formed on the side of the body housing 110 in the direction of shifting the speaker housing 121. As the coupling protrusions 124c engaged with the speaker housing 121 moves along with the movement of the protrusion 124b, the contact between the speaker housing 121 and the elastic body 130 is released and the guide protrusions 123 move along the guide rails 122. Accordingly, the speaker housing 121 is extracted from the body housing 110. The guide protrusions 123 slide along the inclines 122a formed on the guide rails 122, and the speaker housing 121 is pushed down to the back of the body housing 110 by the height of the inclines 122a. When the guide protrusions 123 are engaged with the stoppers 125 formed on the guide rails 122, the speaker housing 121 is extracted to the outside of the body housing 110. Through the speaker module 120 exposed to the outside, the user can listen to the sound played in this mode, and may also enjoy stereo sounds.

Therefore, in the call mode, since the speaker module 120 is retracted inside the body housing 110, the speaker module 120 serves as a receiver of the portable terminal 100 without deteriorating the aesthetic sense of the portable terminal 100, thereby contributing to slimness of the product. In the multimedia mode, the speaker module 120 is extracted to the outside of the body housing 110, improving the quality of the played sounds.

As is apparent from the foregoing description, the portable terminal with a speaker device according to the present invention includes a retractable speaker module at one side of its body housing. In the call mode, the speaker module is retracted inside the body housing face to face with a receiving hole, thereby improving the aesthetic sense and the quality of received sounds and also improving the quality of additional sounds such as bell sounds.

Further, in the multimedia mode, the user can slidingly extract the speaker housing to the outside of the body housing, to listen to high-quality sounds while enjoying multimedia services such as MP3, videos, DMB, and games.

Figure 10:
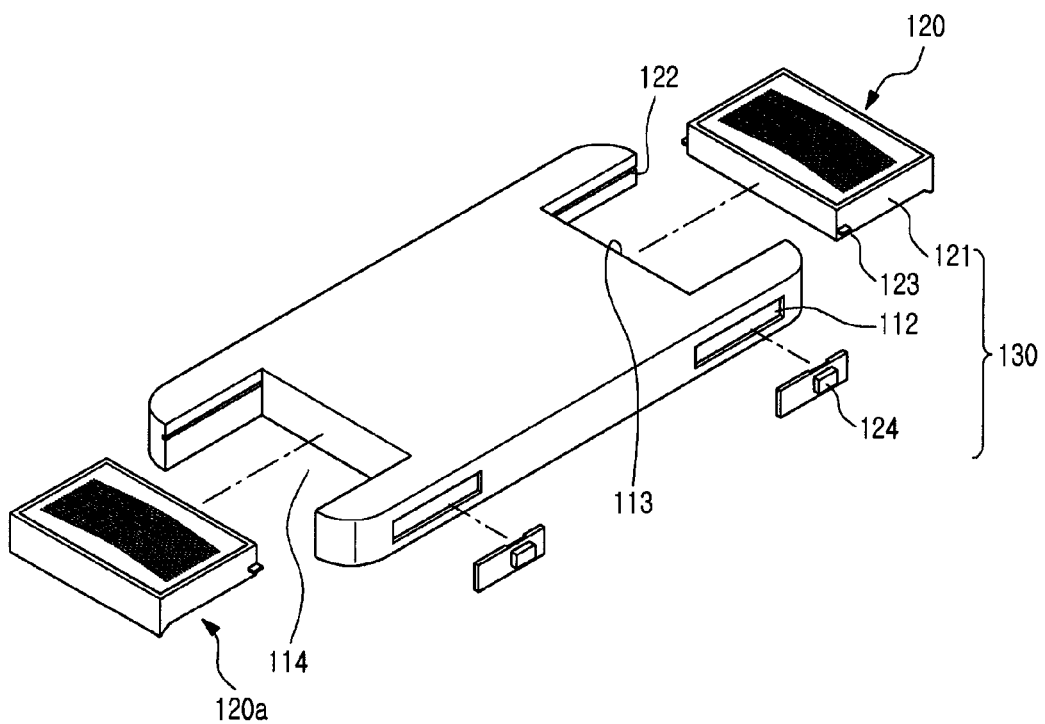
FIG. 10 shows another exemplary embodiment in which a second installation space and a second slidable speaker module are present.

While the invention has been shown and described with reference to certain exemplary embodiments thereof, it will be understood by those skilled in the art that various changes in form and details may be made therein without departing from the spirit and scope of the invention as defined by the appended claims and their equivalents. For example, while one speaker module is retractably provided at one side of the body housing, separate speaker modules may be retractably provided at least two sides of the body housing. FIG. 10 shows a non-limiting example in which a second installation space 114 and a second slidable speaker module 120a are present to provide high-quality sounds.

What is claimed is:

1. A portable terminal with a speaker device, comprising:
a body housing including an installation area containing guide rails; and
a movable speaker module provided in the body housing and slidably retracted into or extracted from the installation area of the body housing along the guide rails;
a receiving hole formed in the body housing in which in a talk mode provides an output of a received sound by the movable speaker module having a speaker housing that is retracted into the body housing to output a sound through the receiving hole;
wherein in a multimedia mode the movable speaker module is extracted from the body housing to outputs a sound that does not pass through the receiving hole.

2. The portable terminal of claim 1, wherein the speaker module comprises:
a speaker housing slidably settled in the body housing;
at least one guide protrusion provided on the speaker housing and slidably engaged with the guide rails; and
a moving member protruding from the speaker housing to an outside of the body housing, for retracting into or extracting from the speaker housing the body housing.

3. A portable terminal with a speaker device, comprising:
a body housing including an installation area containing guide rails; and
a speaker module provided in the body housing and slidably retracted into or extracted from the installation area of the body housing along the guide rails;
wherein the speaker module comprises:
a speaker housing slidably settled in the body housing;
at least one guide protrusion provided on the speaker housing and slidably engaged with the guide rails; and
a moving member protruding from the speaker housing to an outside of the body housing, for retracting into or extracting from the speaker housing the body housing,
wherein a receiving hole is formed in the body housing to output a received sound in the speaker housing to the outside of the body housing, and
wherein an elastic member is provided at a circumference of the receiving hole, and upon retraction of the speaker housing, the elastic member makes contact with the speaker housing to prevent sound leakage between the speaker module and the body housing, and forms a resonance space to output a sound through the receiving hole.

4. The portable terminal of claim 3, wherein an incline is formed on each of the guide rails to push up the speaker housing to a front of the body housing upon retraction of the speaker housing, and to push down the speaker housing to a rear of the body housing upon extraction of the speaker housing.

5. The portable terminal of claim 4, wherein a stopper for stopping movement of the guide protrusion is formed at one end of each of the guide rails.

6. The portable terminal of claim 3, wherein a moving hole is formed in one side of the body housing so that the moving member is slidably settled in the moving hole.

7. The portable terminal of claim 6, wherein the moving member comprises:
   a plate slidably settled in the moving hole;
   a protrusion protruding from one side of the plate to an outside of the body housing, for sliding the plate; and
   at least one coupling protrusion protruding from the other side of the plate and engaged with the speaker housing.

8. The portable terminal of claim 3, wherein the speaker housing is retracted inside the body housing, makes contact with the elastic member and outputs a received sound through the receiving hole.

9. A portable terminal comprising:
   a housing body including an installation space at a first end, the installation space including a guide rail positioned on opposite sides of the installation space;
   a sliding means positioned along a side of the housing body, the sliding means extending from the housing body;
   a speaker module engaging the sliding means and slidably insertable into and extracted from the installation space along the guide rails; and
   a receiving hole formed in the top surface of the body housing so as to output in a talk mode a received sound in the speaker housing to the outside of the body housing, the receiving hole being opposite to the speaker module when retracted into the insertion space.

10. The portable terminal of claim 9, wherein the guide rails include an incline that lowers the speaker module as the speaker module is extracted from the installation space and raises the speaker module as the speaker module is retracted into the installation space.

11. The portable terminal of claim 9, further comprising:
    an elastic module positioned between the speaker module and a top surface of the housing body.

12. The portable terminal of claim 9, wherein the speaker module includes at least one guide protrusion, the at least one guide protrusion engaging a corresponding one of the guide rails.

13. The portable terminal of claim 12, further comprising:
    at least one stop means incorporated into the guide rails, the stop means engaging the guide protrusions to prevent the guide protrusions from exiting the guide rails.

14. The portable terminal of claim 9 further comprising:
    a second installation space incorporated into a second end of the housing body, the second end being opposite the first end; the second installation space including guide rails along a side of the second installation space;
    a second sliding means positioned along a side of the housing body, the second sliding means extending from the housing body;
    a second speaker module engaging the second sliding means and slidably insertable into and extracted from the second installation space along corresponding guide rails.

15. A portable terminal comprising:
    a housing comprising:
       an installation space in a first end of the housing; and
       a slot of a known length within a side of the housing adjacent to the installation space;
    a sliding mechanism positioned within the slot internal to the housing, the sliding mechanism including a plate and a first and second protrusions extending substantially perpendicular to the plate, wherein a first protrusions extends through the slot; and
    a speaker module engaging the second protrusion of the plate and including guide protrusions that engage the guide rails, the speaker module retracted into the installation space when the sliding mechanism is in a first position and extracted from the installation space when the sliding mechanism is in a second position,
    wherein in the first position in a talk mode the speaker module outputs sound through a receiving hole arranged in the housing, and
    wherein in the second position in a multimedia mode the speaker module is outputs a sound that does not pass through the receiving hole.

16. The portable terminal of claim 15 wherein the guide rails include an incline that raises the module when the sliding mechanism is in the first position and lowers the module when the sliding mechanism is in the second position.

17. The portable terminal of claim 15, further comprising a stopping means incorporated into the guide rails to limit the extraction of module from the installation space.

* * * * *

UNITED STATES PATENT AND TRADEMARK OFFICE
CERTIFICATE OF CORRECTION

PATENT NO.      : 8,351,638 B2
APPLICATION NO. : 12/691888
DATED           : January 8, 2013
INVENTOR(S)     : Jung-Won Park Page 1 of 1

It is certified that error appears in the above-identified patent and that said Letters Patent is hereby corrected as shown below:

In the Claims:

Column 6, Claim 1, Line 22 should read as follows:
--...housing to output a sound...--

Column 8, Claim 15, Line 33 should read as follows:
--...speaker module outputs a sound...--

Signed and Sealed this
Twenty-third Day of April, 2013

Teresa Stanek Rea
*Acting Director of the United States Patent and Trademark Office*